United States Patent [19]

Nguyen

[11] Patent Number: 5,689,566
[45] Date of Patent: Nov. 18, 1997

[54] NETWORK WITH SECURE COMMUNICATIONS SESSIONS

[76] Inventor: Minhtam C. Nguyen, 10018 Lexington Estates Blvd., Boca Raton, Fla. 33428

[21] Appl. No.: 547,346

[22] Filed: Oct. 24, 1995

[51] Int. Cl.$^6$ .................................................. H04K 1/00
[52] U.S. Cl. ........................... 380/25; 380/29; 380/49
[58] Field of Search ................................ 380/25, 23, 24, 380/4, 46, 49, 29

[56] References Cited

U.S. PATENT DOCUMENTS

| | | | |
|---|---|---|---|
| 4,227,253 | 10/1980 | Ehrsam et al. | 375/2 |
| 5,060,263 | 10/1991 | Bosen et al. | 380/25 |
| 5,073,852 | 12/1991 | Siegel et al. | 395/700 |
| 5,111,504 | 5/1992 | Esserman et al. | 380/21 |
| 5,136,716 | 8/1992 | Harvey et al. | 395/800 |
| 5,142,622 | 8/1992 | Owens | 395/200 |
| 5,220,655 | 6/1993 | Tsutsui | 395/325 |
| 5,226,172 | 7/1993 | Seymour et al. | 395/800 |
| 5,239,648 | 8/1993 | Nukui | 395/600 |
| 5,241,599 | 8/1993 | Bellovin et al. | 380/21 |
| 5,261,070 | 11/1993 | Ohta | 395/425 |
| 5,263,165 | 11/1993 | Janis | 395/725 |
| 5,268,962 | 12/1993 | Abadi et al. | 380/21 |
| 5,301,247 | 4/1994 | Rasmussen et al. | 380/43 |
| 5,311,593 | 5/1994 | Carmi | 380/23 |
| 5,323,146 | 6/1994 | Glaschick | 340/825.34 |
| 5,369,707 | 11/1994 | Follendora, III | 380/25 |
| 5,373,559 | 12/1994 | Kaufman et al. | 380/30 |
| 5,375,207 | 12/1994 | Blakely et al. | 395/200 |
| 5,392,357 | 2/1995 | Bulfer et al. | 380/33 |
| 5,416,842 | 5/1995 | Aziz | 380/30 |
| 5,418,854 | 5/1995 | Kaufman et al. | 380/23 |

OTHER PUBLICATIONS

Bruce Schneier, *Applied Cryptography* (second edition), New York, NY, John Wiley & Sons, Inc, 1996, pp. 298–301.

*Primary Examiner*—David C. Cain
*Attorney, Agent, or Firm*—John C. Smith

[57] ABSTRACT

A system which uses three way password authentication, encrypting different portions of a logon packet with different keys based on the nature of the communications link. Nodes attached to a particular LAN can have one level of security for data transfer within the LAN while data transfers between LANs on a private network can have a second level of security and LANs connected via public networks can have a third level of security. The level of security can optionally be selected by the user. Data transfers between nodes of a network are kept in separate queues to reduce queue search times and enhance performance.

20 Claims, 13 Drawing Sheets

Figure 13A
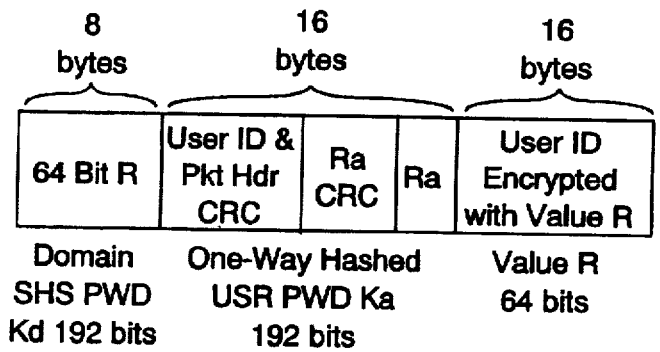
Figure 13B 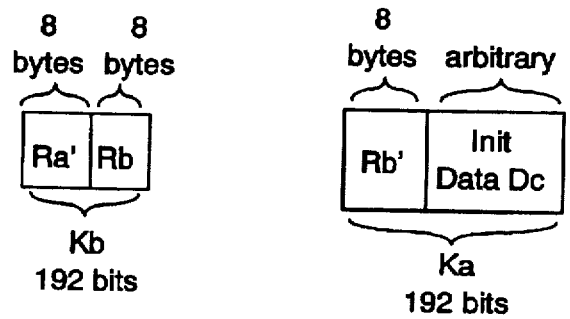 Figure 13C
Figure 13D
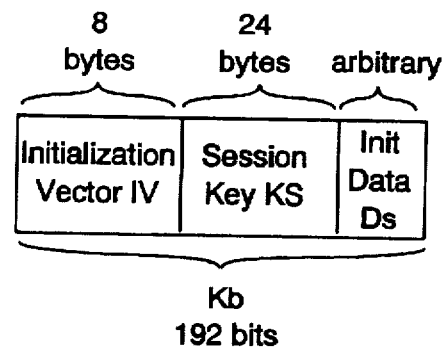
Figure 13E
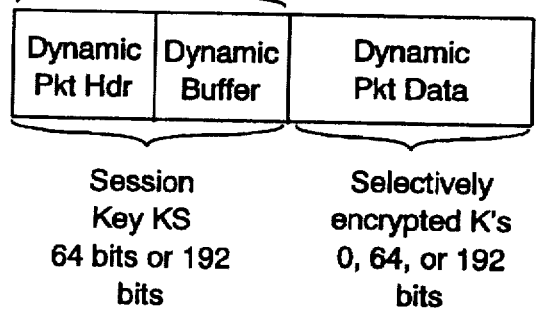

NETWORK WITH SECURE COMMUNICATIONS SESSIONS

BACKGROUND OF THE INVENTION

1. Technical Field

The present invention relates to computer network security. In particular, it relates to networks which use dynamic packet headers and multiple levels of packet encryption to transfer data to and from a remote server or to and from another node in the local network.

2. Background Art

The development of small independent systems such as personal computers has provided several benefits to users. By providing each user with their own processor and data storage, personal computers provide consistent performance and data security. A cost of these benefits is the inconvenience which results from the inability to easily access data by other members of an organization.

The use of mainframe systems, and the later development of alternative systems such as LANs (Local Area Networks) and servers reduces the inconvenience of making data available to all members of an organization, but results in unpredictable performance, and more importantly results in exposure of sensitive data to unauthorized parties. The transmission of data is commonly done via packet based systems which have user ID and password information in a header section. Interception of a packet with header information allows the intercepter to learn the user ID and password which will in turn allow future penetration of the user's system and unauthorized access to the user's data. It would be desirable to transmit user identification and password information in a manner which would be indecipherable to an unauthorized interceptor.

Data security is endangered not only by access by outside parties such as hackers, industrial spies, etc, but also to inadvertent disclosure of data to unauthorized members of the organization. For example, data exchange at certain levels of management may cause problems should the information be disclosed to the general employee population. Likewise, the transmission of personal information such as banking codes over networks has exposed individuals using online financial systems to the possibility of fraudulent access to their funds by third parties.

In addition to data security, the use of network systems such as LANs has created performance problems due to the queuing of requests from multiple locations and the unpredictable delays associated with queuing fluctuations. It would be advantageous if a system could provide not only data security, but also more consistent performance.

The prior art has failed to provide network systems which ensure that access to data is restricted to authorized parties while at the same time providing more consistent performance.

SUMMARY OF THE INVENTION

The present invention solves the foregoing problems by providing a system which uses three way password authentication, encrypting different portions of a logon packet with different keys based on the nature of the communications link. Nodes attached to a particular LAN can have one level of security for data transfer within the LAN while data transfers between LANs on a private network can have a second level of security and LANs connected via public networks can have a third level of security. The level of security can optionally be selected by the user. Data transfers between nodes of a network are kept in separate queues to reduce queue search times and enhance performance.

BRIEF DESCRIPTION OF THE DRAWINGS

FIG. 5A is the memory layout used for TCP/IP and NetBIOS. FIG. 5B is the memory layout used by SMODEM or SRS232 communications systems.

FIGS. 13A–D are diagrams illustrating the packet headers used in the logon procedure of the preferred embodiment.

FIG. 13E are diagrams illustrating the packet headers used during data transfer in the preferred embodiment.

DESCRIPTION OF THE PREFERRED EMBODIMENT

Figure 1:
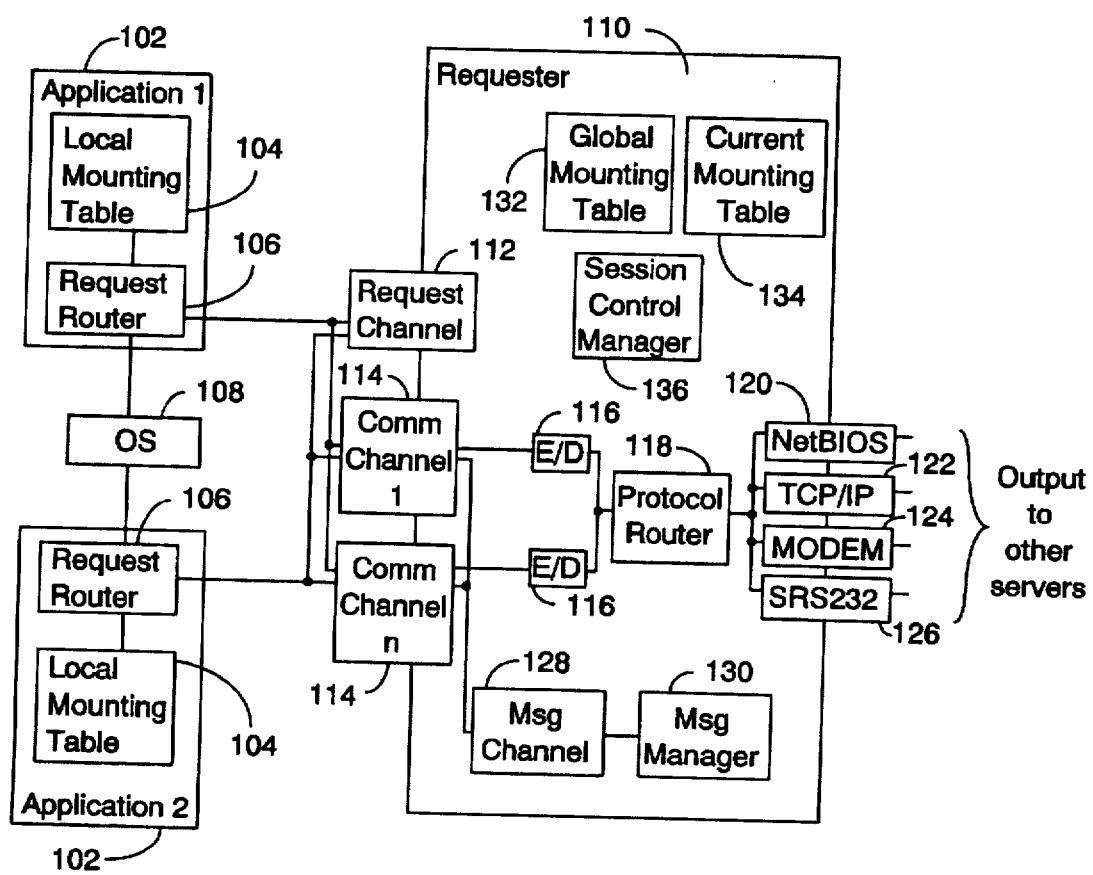
FIG. 1 is a diagram showing the connection between applications and the requester in a local system.

Prior to a detailed description of the figures, a general discussion of the operation of the preferred embodiment follows. A network can take a variety of forms. For example, it can be two personal computers communicating via modem; it can be a single LAN system within a particular facility; it can be a remote server or mainframe system with communications links to individual terminals or personal computers; it can be a network of LANs or other servers each communicating with one another or through one another; or it can be any of the foregoing systems which use not only dedicated communications lines, but also nondedicated communications (i.e. public networks such as the Internet) through a "firewall". The use of the term firewall herein refers to the requirement for increased levels of security to avoid the possibility of unauthorized data access by parties outside of the organization. Likewise, a machine in the network can act as a client or a server depending on the nature of the data transfer.

In the preferred embodiment, communication between a client and a server is as follows. The server waits for connection requests from clients on the network. The server can be started with one or more supported protocols to enable support of a variety of client types on the network.

For example, the server protocols can include, among others, NetBIOS, TCP/IP, SMODEM and SRS232. All of the foregoing protocols are well known in the art.

When a user on a client machine wishes to initiate a data transfer or other function, the client application activates a requester to access resources in the network. When the server receives a request from a client application, it activates a thread to process the request. A thread is an execution unit of an operating system. Operating systems used for this type of system are Microsoft Windows 95 (trademark of Microsoft Corporation), Microsoft Windows NT (trademark of Microsoft Corporation), IBM OS/2 (trademark of IBM Corporation). These systems may use multiple session protocols such as NetBIOS and TCP/IP or single session protocols such as SMODEM or SRS232.

In single session protocols such as SMODEM and SRS232, the same thread is used to process the request from a client since a serial port can act as a server or client, but cannot simultaneously act as a server and client. Multiple session protocols create a new thread, referred to as an original thread, and wait for a request from a client. When a request is received, the thread is referred to as a server processing thread which is used to process the client logon.

After the logon is successfully completed, the server processing thread creates a packet queue and a packet thread to receive incoming packets and place them in the packet queue. The server then waits for packets to arrive. On the client side, the client creates a session write thread to initiate contact with the server. In addition, the client creates a second thread which is referred to as the session read thread. This thread is used to receive packets sent from the server to the client.

To use resources on the network, users must first logon the server to prove their identity. A logon request is sent from the client's logon application to the requester on the client computer. Before logon data can be exchanged between the applications and the requester, a command manager is created by the requester to accept application requests. The command manager is responsible for housekeeping requests within the client computer.

In the preferred embodiment, the logon procedure uses a three way authentication to prevent the password from being transferred over the computer and also to allow both the client and the server to authenticate each other. In addition, the authentication procedure prevents unauthorized penetration of the system security by detecting the replaying of packets by third parties.

The three way authentication system encrypts the very first logon packet with different keys for each part of the packet as follows.

The first step takes place at the client computer as follows.

1—The client generates a 32 bit random number value which is concatenated to a predefined 32 bit constant to form a 64 bit value R.

2—The CRC signature C1 of the 64 bit value R and the user ID is calculated. This signature value allows detection of packet manipulation.

3—The 64 bit value R is used as a DES key to encrypt the user ID. This makes the user ID look random for each logon packet.

4—The client generates a 192 bit key K from the server name to encrypt the 64 bit value R.

5—The client generates a key Ka from the user ID and password using a one way hash function such as the Secure Hash Standard (SHS) specified in the Federal Information Processing Standards Publication 180 (FIPS PUB 180).

6—The client generates a random number Ra, calculates its CRC signature C2, and encrypts them with the signature C1 using the key Ka. This signature is used to validate the key Ka by the server.

The second step in the process takes place at the server. When the server receives the first logon packet it decrypts the packet as follows.

1—The server generates a key K2 from its machine name and the SHS to decrypt the packet header for identification. If the packet header does not contain the predefined constant, the user is unauthorized. This occurs when an unauthorized user tries to access the server over the phone line but does not know the server name (since the phone number is a public record but the server name is private).

2—If the user is authorized, the server uses the decrypted 64 bit value R in the packet header as a key to decrypt the user ID.

3—The server then uses the user ID to search a database for an access record. If the access record cannot be found, the user has entered an invalid ID and the session is terminated. If the access record is found, the server verifies if the user is allowed access to network resources at this date and time.

4—If access date and time are verified, the server retrieves an associated one way hashed password Kb from an encrypted password file to decrypt the random number Ra and the CRC signatures. The password file is encrypted with a key Kk which is selected by the system administrator at installation.

5—The random numbers Ra and the CRC signatures are then decrypted. The server calculates the CRC signature of the packet header, the user ID and the random number Ra. If the calculated signatures match the decrypted signatures C1 and C2 stored in the packet, and if password Ka matches Kb, the server manipulates the client random number Ra with a predefined formula, generates a random number Rb, and encrypts both random numbers Ra and Rb with the password Kb before sending the first logon response packet to the client.

The third step in the process takes place at the client computer as follows.

1—The client decrypts the first logon response packet.

2—The client manipulates the random number Ra with the predefined formula and compares it with the one returned from the server. If the numbers match, the client knows that it is connected to the correct server, not a fraud server from which an eavesdropper has captured transmissions from the previous logon and is echoing packets back to the client computer.

3—The client manipulates random number Rb with another predefined formula and concatenates it with the client's initiating data (i.e., the client initial packet sequence number, the encryption and compression mode for the session, and the operating system platform ID) to form a second logon packet. The operating system platform ID is useful for selecting protocols and data formats when a particular client or server is communicating with systems that may have any one of a variety of operating system software programs running. The client would typically request encryption and compression mode for the session. However, the server may indicate that the particular modes requested are not available.

4—The client then encrypts the second logon packet and sends it to the server.

The fourth step in the process takes place at the server computer as follows.

1—The server decrypts the second logon packet.

2—The server manipulates the random number Rb with the same predefined formula used by the client and verifies if the random numbers are matched. If the random numbers match, then the server knows it is communicating with an authorized client and that the first logon packet was not a replayed packet.

3—The server saves the client initiating data, generates a session key Ks and an initialization vector IV. In the preferred embodiment, Ks and IV are generated using the formula specified in Appendix C of the ANSI X9.17 standard.

4—Ks and IV are sent to the client along with the server initiating data (i.e., the server initial packet sequence number, supported and/or approved encryption and compression modes for the session, and the server operating system platform ID).

The client and server initial packet sequence numbers are used to detect packet deletion and insertion for data exchanged after the logon procedure.

The fifth step in the process takes place at the client computer as follows.

1—The second logon response packet is decrypted by the client.

2—The client encrypts Ks and IV with its own key and saves them in memory for future communication with the server. The logon procedure completes here.

After the logon procedure is successfully completed, all packet headers are encrypted using the session key Ks and the IV. The packet headers are encrypted to prevent intruders from deleting, inserting, modifying, and/or replaying the packets which may have been captured while data was exchanged over communication lines.

For ease of illustration, the following symbols can be used to illustrate the logon process:

Where:

C=a client

S=a server

E=a symmetric cryptosystem such as DES

K=an encryption key generated from the server name

R=a 32 bit random number concatenated with a pre-defined constant

Ka=a 192 bit key one way hashed from the user ID and password

Ra=a 64 bit random value generated by C f( )=a hash function such as CRC to calculate the signature g( )=a hash function such as CRC to calculate the signatures UID=user IDs Kb=a 192 bit one way hashed key retrieved from a database ha( )=a hash function to manipulate the random number Ra Rb=a 64 bit random value generated by S hb( )=a hash function to manipulate the random number Rb Dc=client initial data IV=an initial chaining vector for encryption Ks=a session encryption key Ds=server initial data R'a=ha(Ra)

R'b=hb(Rb)

The logon procedure may be listed as:
1. C to S: EK(R)+EKa(Ra,f(Ra,g(R,UID))+ER(UID)
2. S to C: EKb(R'a,Rb)
3. C to S: EKa(R'b, Dc)
4. S to C: EKb(IV,Ks,Ds)

An important advantage of the authentication procedure used by the preferred embodiment is that both the client and the server verify each other as legitimate without sending the password. In addition, the use of a second set of logon packets which contain different encrypted random numbers precludes access by an unauthorized intruder who merely replays intercepted packets.

The heart of this authentication procedure is in the middle part of the logon packet, which contains the random number Ra and the CRC signatures. Since the CRC signature C2 of the random number Ra is encrypted and sent along with the logon packet, the server can authenticate the user right on the first logon packet. The manipulation of the random numbers Ra and Rb in the challenge-response fashion is to help the server defeat the replaying of the logon packet and to allow the client to authenticate the server and to defeat packet replaying as well.

The 32-bit random number in the packet header is used to make the packet header and the user ID look different for every logon packet. The one-way hashed server name is used as a key to quickly detect invalid logon packets before searching the database. This case may occur frequently when the SMODEM protocol is activated to wait for data transferred over a telephone line (i.e., a wrong number is dialed by accident or a call generated by a manual or automated telemarketing company is being received).

In addition, the server name is isolated from the user ID and password when creating a one-way hashed password to allow the portability of the database. For example, when a business grows, another server may be needed at another location and the database can be easily transferred to the new server. Of course, it would be less time-consuming to delete unauthorized users from the database than to add authorized users to the new one. To better protect the valuable information in the database, a password is required before access to the database is granted. More important, the database can be shared among servers. For example, a server Sb can receive the first logon packet and forward the user ID to a database server Sc within a private network for verification. If an access record is found and the user can access the server Sb at this date and time, the database server Sc returns the encrypted one-way hashed password Kb to the server Sb. The server Sb then continues the challenge-response as if the password Kb is returned from a local database. Note that the database server Sc encrypts the one-way hashed password Kb with the session key defined for communication between the server Sb and Sc before sending it across the private network.

In comparison to prior art systems, the design of this invention provides the server a better opportunity to resynchronize itself if the first logon packet is invalid since the receiver of the authenticating packet is in control of what is next, not the sender. On the other hand, in the prior art the sender is in control of what is next. For example, the sender generates a public key, encrypts it with a shared secret key and sends it to the receiver. If the secret key is invalid, the receiver cannot detect it. Thus, a certain number of packets must be received before the receiver can resynchronize or the receiver might have to use a timeout to resynchronize itself.

Finally, the logon protocol of the preferred embodiment is more suitable for a client/server distributed environment, because this logon protocol allows both client and server to authenticate each other without sending the user password across the communication media and prevent intruders from deleting, inserting, modifying, or replaying the logon packets. In addition, if the logon procedure fails at any point, the server releases all resources and destroys the connection without sending the response packet at that point, i.e., if the user enters a wrong server name in the very first logon packet, nothing is sent out from the server to prevent the user, a potential intruder, from knowing anything about the server. Note that this mutual authentication technique requires the client machine to have a local CPU so that the password will not be transmitted over the network before being encrypted.

The client can now perform a mounting procedure to link a network resource on the server to a virtual disk or it can identify a network resource with the following format \\servername\netname:protocol. The format allows the client to communicate with a network domain using any supported protocols. Further, this protocol can be different from the protocol used to perform the logon procedure. That is, the logon communication protocol can be different from the mounting communication protocol. Also, different virtual disks can be mounted with different protocols to different network domains. This method allows communication between a client and network domains, between a network domain and other network domains using multiple communication protocols simultaneously.

Figure 2:
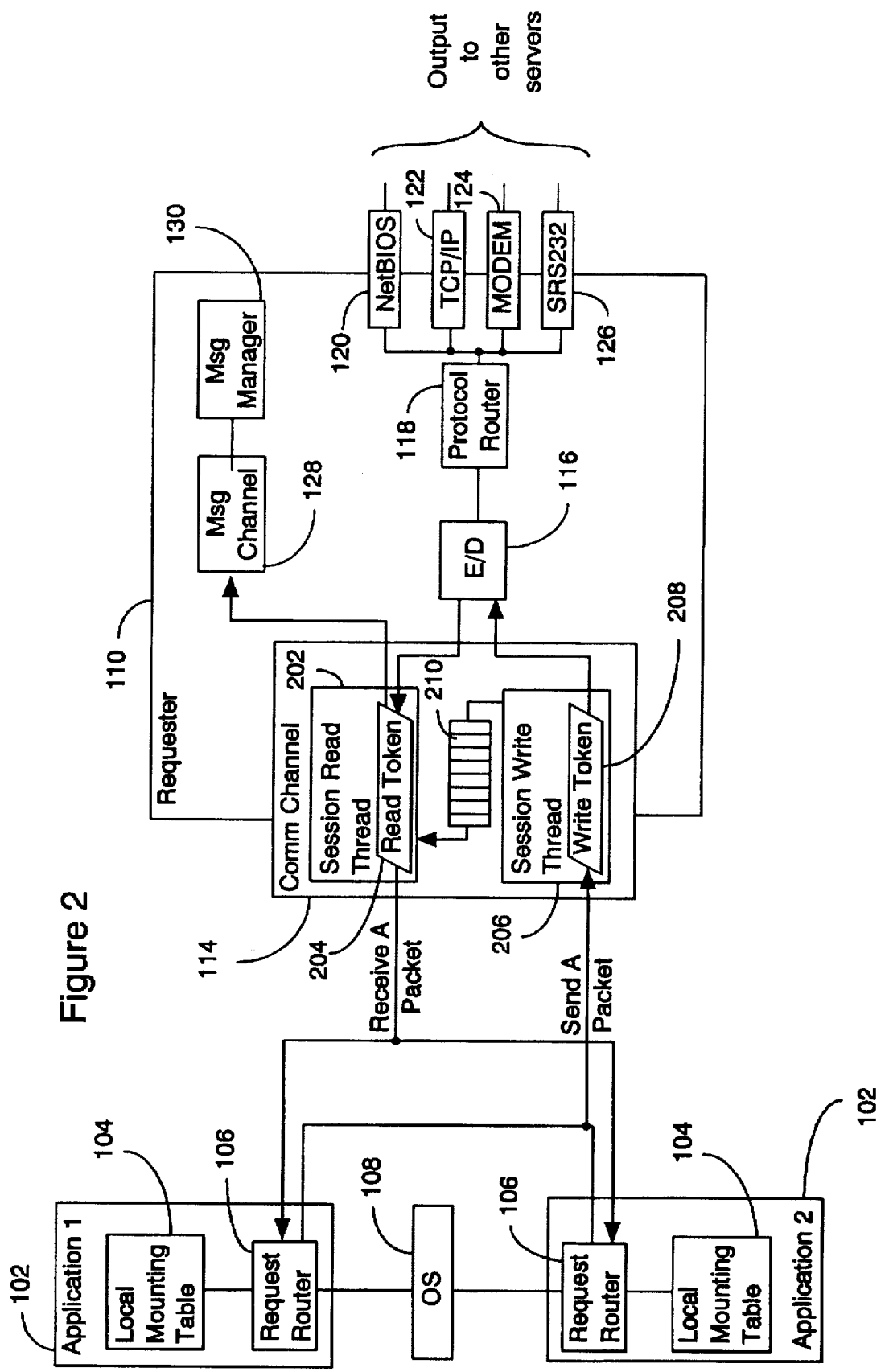
FIG. 2 is the diagram of FIG. 1 with a more detailed view of the requester.

Referring to FIGS. 1 and 2, these figures illustrate the interconnection between a client and a server. FIG. 2 is a more detailed view of the system of FIG. 1.

To perform a file transfer operation, an application 102 calls a request router 106. The request router first verifies if the application 102 requests a local or remote resource. This verification is performed using a local mounting table 104 which the request router 106 obtains from the requester 110 when the application 102 is first started.

If the resource is local, the request router 106 calls a local system function call to perform the request and returns the control to the application 102. However, if the resource is remote, the request router 106 first searches its local list to see if the needed communication handle is already stored in the list. This communication handle contains information of the read 204 and write 208 tokens (shown in FIG. 2) and their associated resources. If the communication handle is not found in the local list, the request router 106 sends a message to the requester 110 over the request channel 112 to obtain the handle. Once the handle is obtained, the request router 106 creates a response signal, i.e., a return address, requests the ownership of the write token 208, stores the response signal into the packet header, builds a packet based on the application's 102 request into the write token 208, and signals the session write thread 206 of the communication channel 114 that there is a packet to send.

If the application data is larger than the packet capacity, the request router 106 can send multiple packets in a series at this point. After the packet is sent to the server, the request router releases the write token for use by another thread in the same process or a different process. If the packet was sent to the server successfully, the request router 106 waits for the corresponding response packets, i.e., a packet can cause multiple response packets returned from the server.

When a response packet arrives, the session read thread uses the response signal to tell the corresponding request router that its response packet has come and is available in the read token. At that time, the read token is accessed exclusively by the designated request router. The router then transfers data in the response packet directly to the application's buffers and signals the session read thread 202 of the communication channel 114 that the read token 206 is no longer in use so that the session read thread 202 can re-use the read token 206 for other incoming packets. Finally, after all response packets of a request packet have arrived, the request router 106 destroys the response signal and returns control to the application 102. The final response packet is determined by a bit in the packet attribute.

The request router 106 sends a message to the command manager of the requester 110 to request the communication handle containing information of the read 204 and write 208 tokens and their associated resources. If the handle already exists, it is passed to the request router 106 immediately after the requester 110 increments the access count of the handle. However, if the handle does not exist at that time, the requester 110 will load the appropriate communication library, allocate the tokens 204, 208 and their associated resources, create a communication channel consisting of a session write thread 206 to perform auto-logon, create a session read thread 204 for the communication channel 114 if auto-logon is successful, and increment the access count of the handle before passing it to the request router 106.

After receiving the handle, the request router 106 saves the handle for use during the entire lifetime of the application. When the application 102 terminates, the request router 106 will signal the requester 110 of the event so that it can decrement the access count of the handle. When the access count is zero for a certain period of time, the session manager of the requester 110 will drop the communication session, release the tokens 204, 208 and their associated resources, and unload the communication library. Thus, this method allows resources to be allocated upon demand and released when no longer in use. Furthermore, the request router 106 can translate and format data in the application timeslices while the requester 110 is communicating with communication devices 120, 122, 124, 126 to better use the CPU time.

The request router 106 can also perform any preparation necessary to transfer the application 102 request to the requester 110 before requesting the ownership of the write token 208 to reduce the time it takes to access the write token 208. In addition, the request router 106 remembers resources for one application 102 at a time. Thus, it reduces the time to search for the needed information. With this method of sending and receiving packets, data can be exchanged asynchronously between a client and a server with minimum resources in a minimum time. In addition, request packets can be accumulated on the server for processing while the previous response packet is processed by the communication devices 120, 122, 124, 126 or traveling over the network.

Message channel 128 and message manager 130 are used to control system messages transmitted in the system. Current mounting table 134 and global mounting table 132 are used to identify usage of system resources. The session control manager is used to control each session between a client and a server.

Figure 3A:
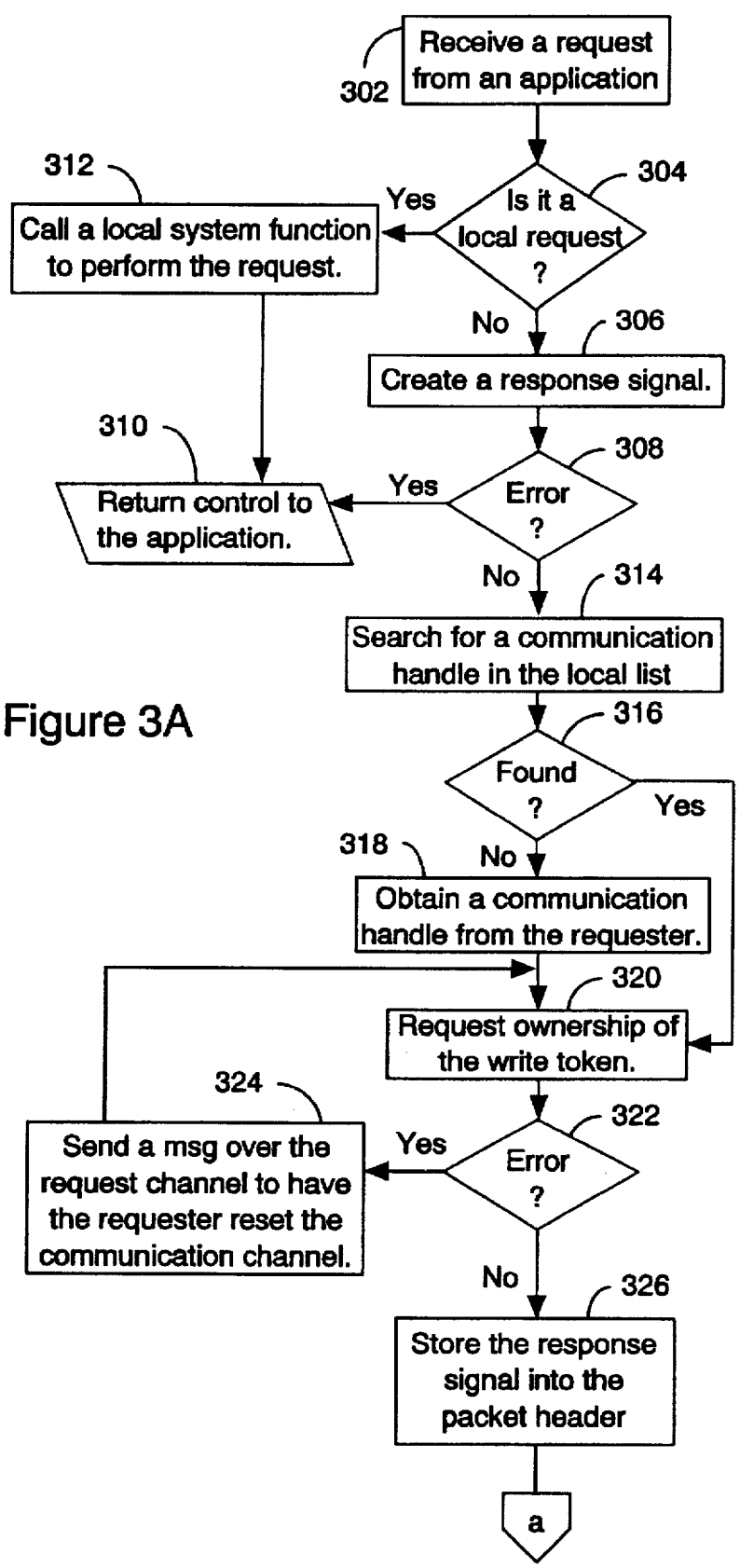
FIGS. 3A–B are a flow diagram illustrating data transfer between the application and requester of the preferred embodiment.
Figure 3B:
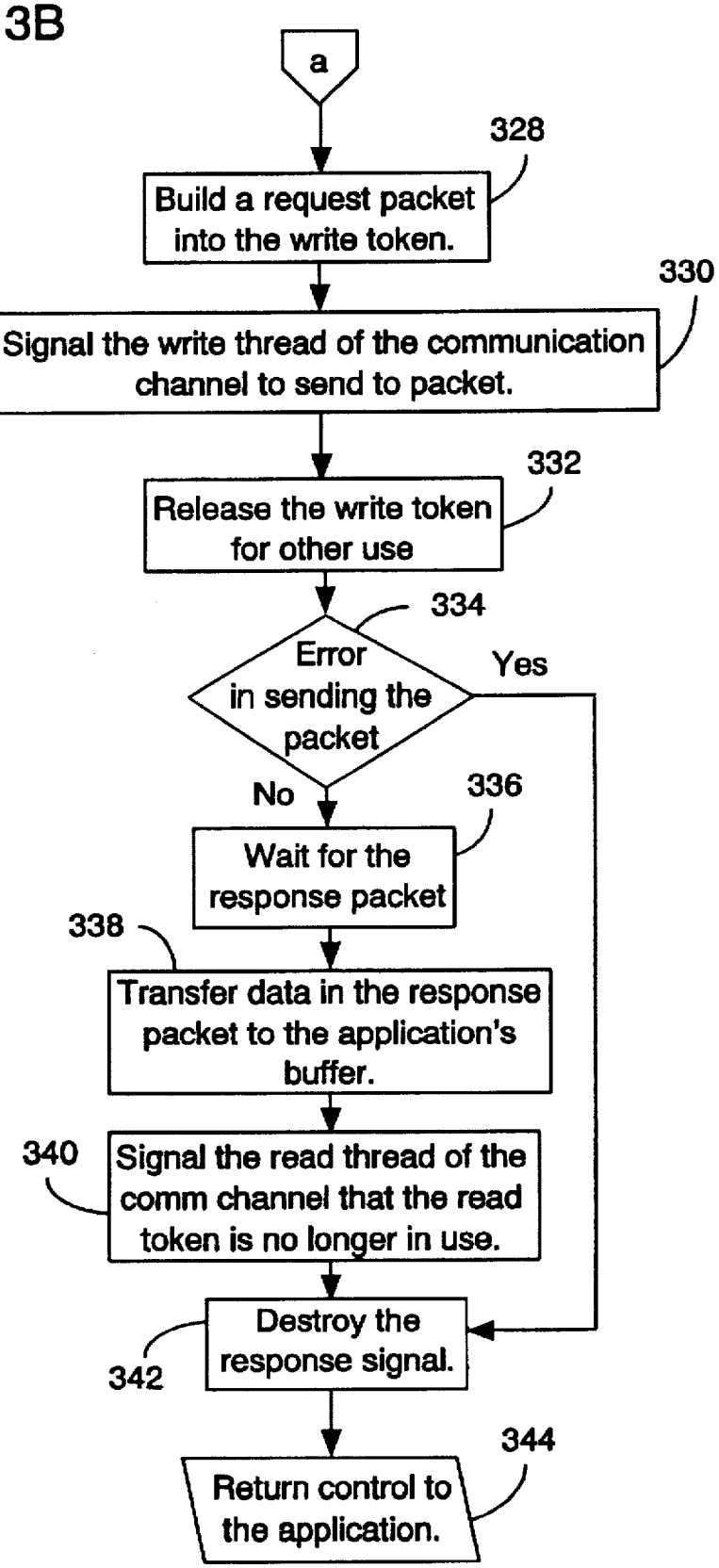

FIG. 3A and B is a flowchart which illustrates the transfer of information in a session after the logon procedure has completed. When a resource request 302 is made, the system 304 first tests to see if it is for a local resource 304. If so, a local function is called 312 and control is returned 310 to the application. If it is not a local resource, the system creates a response signal 306. If the response signal 306 cannot be created, control is returned to the application. If it is, then the local list is searched 314 for the communication handle. If the communication handle is not found 316, a communication handle is obtained 318 from the requester and then ownership if the write token is requested 320. However, if the communication handle is found 316, then ownership if the write token is immediately requested 320.

If no error occurs when the request for ownership of the write token is made 322, then the response signal is stored in the packet header 326, a request packet is built into the write token 328, the write thread sends the packet, and the write token is released 332. If an error is detected when the packet is sent, the response signal is destroyed 342 and control is returned 344 to the application. If no errors occur during packet transmission 344, then the system waits 336 for the response packet, the data in the response packet is transferred 338 into the application's buffer, the read token is released 340, the response signal is destroyed 342 and control is returned 344 to the application.

Figure 4C:
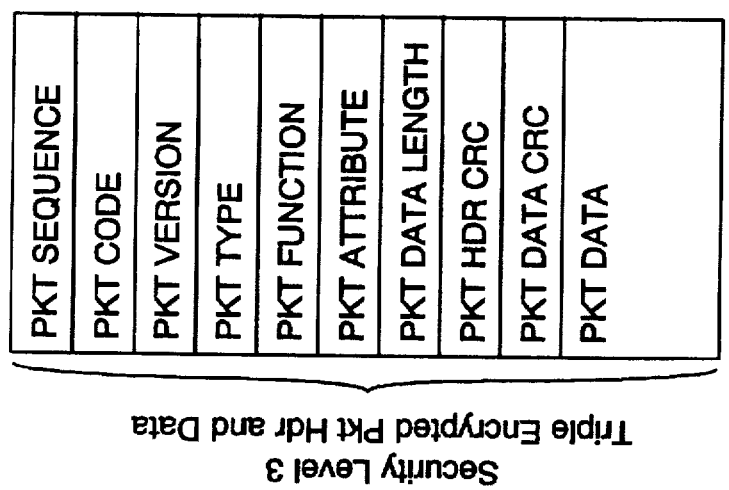
FIGS. 4A–C are diagrams of the memory layout of packet headers used in the preferred embodiment.
Figure 4B:
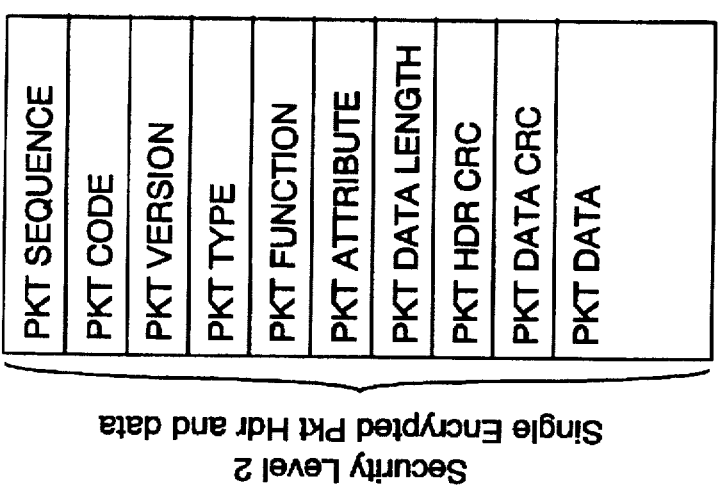
Figure 4A:
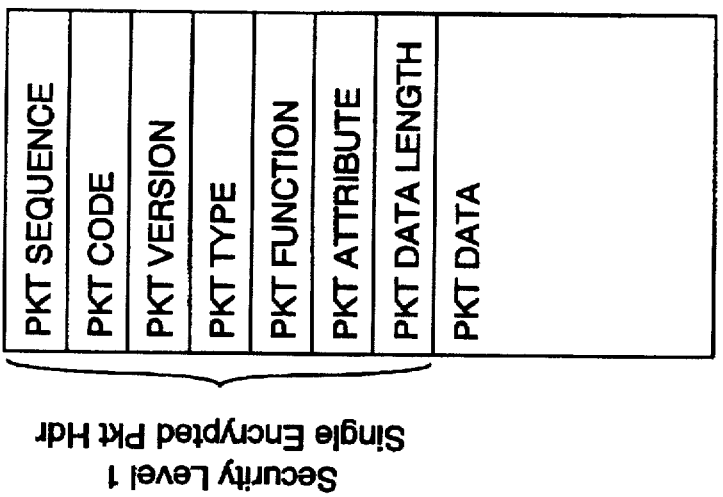

FIGS. 4A–C illustrate the memory layout of the packets used in the preferred embodiment. FIG. 4A illustrates a packet as encrypted by security level 1. In security level 1, the packet header is encrypted using single DES encoding. This level of security incurs the least amount of overhead and is preferably used in more secure environments such as LANs.

FIG. 4B illustrates a packet as encrypted by security level 2. In security level 2, the packet header and data are encrypted using single DES encoding. This level of security incurs slightly increased overhead as compared to security level 1, but provides an increased level of security for less secure environments such as wide area networks.

FIG. 4C illustrates a packet as encrypted by security level 3. In security level 3, the packet header and the data are encrypted using triple DES encoding. This level of security incurs the most overhead as compared to security levels 1 and 2, but provides the highest level of security for insecure environments such as public telephone networks.

To protect data exchanged over communication sessions, the preferred embodiment provides two different encryption schemes available to the user at logon. The first scheme is the US Department of Defense Data Encryption Standard (DES) and the second scheme is the triple-DES specified in the ANSI X9.17 and ISO 8732 standards but with three different keys. In addition, the preferred embodiment applies the Cipher Block Chaining mode specified in the FIPS PUB 81 to better protect the data. Once an encryption scheme is selected, data exchanged over all sessions connected to a network domain are encrypted regardless of the communication protocols being used by the sessions. The price to paid for the encryption is minimum anyway since the preferred embodiment encrypts 500,000 bytes per second when running on a Pentium 66 MHz processor. The operating system used can be any suitable personal computer operating system such a Microsoft (TM) Windows 95 (TM), IBM (TM) OS/2 Warp (TM), Unix, etc. If the server is a large system, any one of a number of suitable mainframe operating system software may be used.

In addition to the above encryption schemes, the preferred embodiment employs a dynamic packet header technique to provide extra securities based on the security level selected by the user at logon. If a security level 2 is selected, the packet header and data are encrypted with DES and the packet header is changed to 24 bytes to carry the CRC signatures of the packet header and data for authentication. However, if a security level 3 is selected, the packet header and data are encrypted with triple-DES using three different keys. Finally, if security level 1 is selected, the packet header remains at 16 bytes and no signature is verified for a better performance but the packet header is encrypted with DES to provide security against other threads. Thus, thanks to the dynamic packet header technique, a user can setup different types of firewalls wherever he needs them. For instance, the user can connect to his office from his home using security level 2 and setup his office machine to connect to another server within his organization using a lower security level to gain a better performance.

In order to provide better security, the preferred embodiment allows the user to select if the data should stay in its encrypted form so that only authorized personnel can view the data. This is important for sensitive business data, personnel data, etc. Of course, the key to decrypt the data must be agreed to ahead of time or exchanged over some secured channels to protect the secrecy of the key.

Of course, those skilled in the art will recognize that the user could also have the capability of instructing the system that no encryption will be used. In this case, no encryption would represent a fourth security level (security level 0). Security level 1–3 having been discussed in regard to FIG. 4.

Figure 5A:
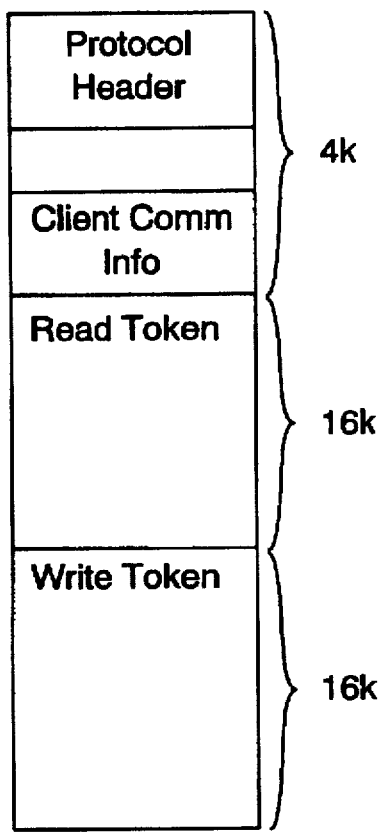
FIGS. 5A–B are diagrams showing the memory layout of entries in the packet queue.
Figure 5B:
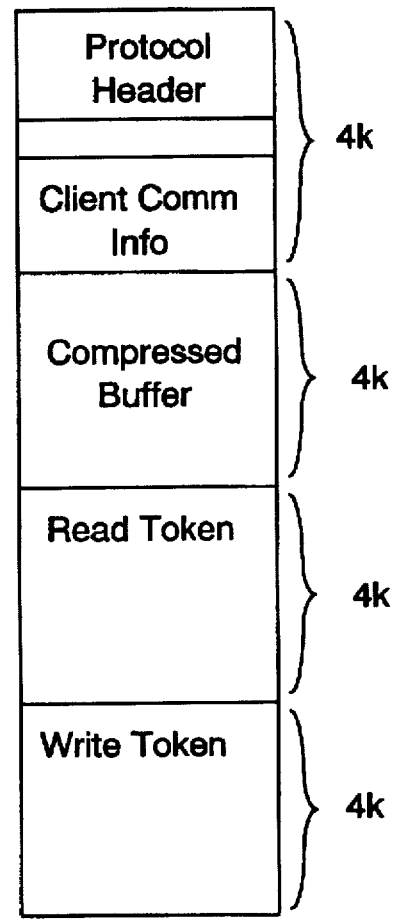

FIGS. 5A–B illustrate the packet queue structure used in the preferred embodiment. FIG. 5A illustrates the TCP/IP and NetBIOS communications structure and FIG. 5B illustrates the SMODEM and SRS232 communications structure. The compressed buffer is a work buffer used to compress data prior to transmission through SMODEM or SRS232 communication lines. A packet header is placed at the beginning of the read token and at the beginning of the write token. In the preferred embodiment, the read and write tokens are stored in shared memory.

Figure 6:
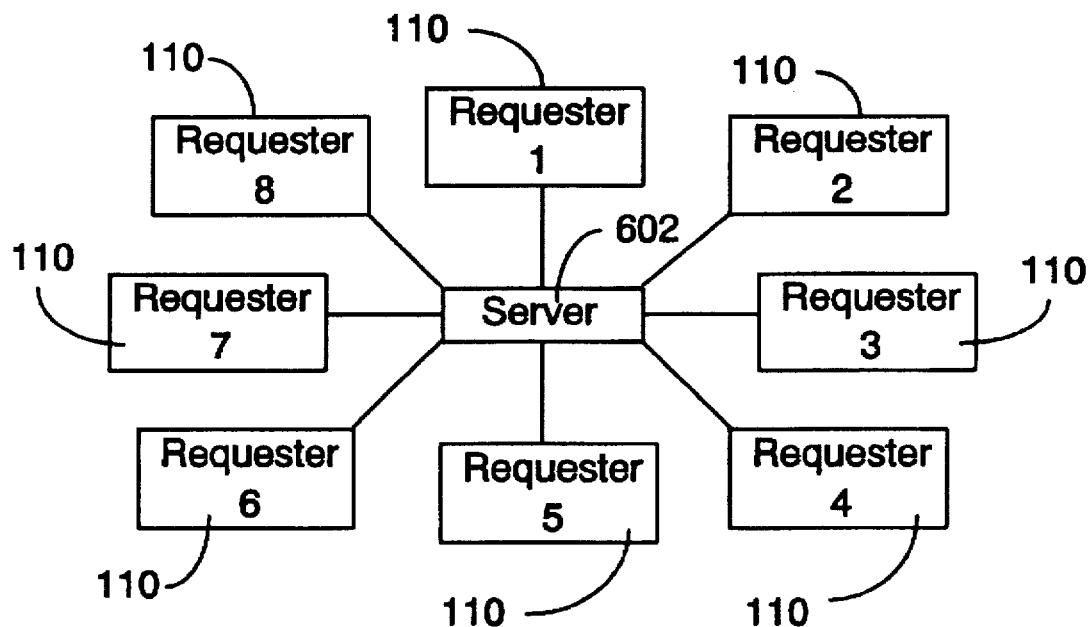
FIG. 6 is a diagram of a multi-requester system with a single server.

FIG. 6 illustrates a configuration in which multiple requesters 110 communicate with a single server 602.

Figure 7:
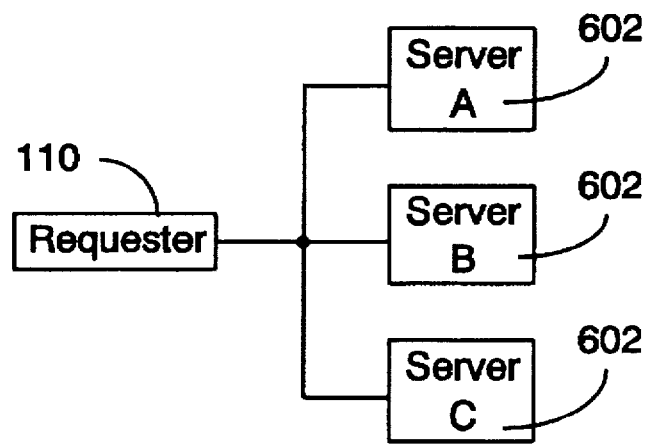
FIG. 7 is a diagram illustrating a single requester attached to three servers.

FIG. 7 illustrates a configuration in which a single requester 110 communicates with multiple servers 602.

Figure 8:
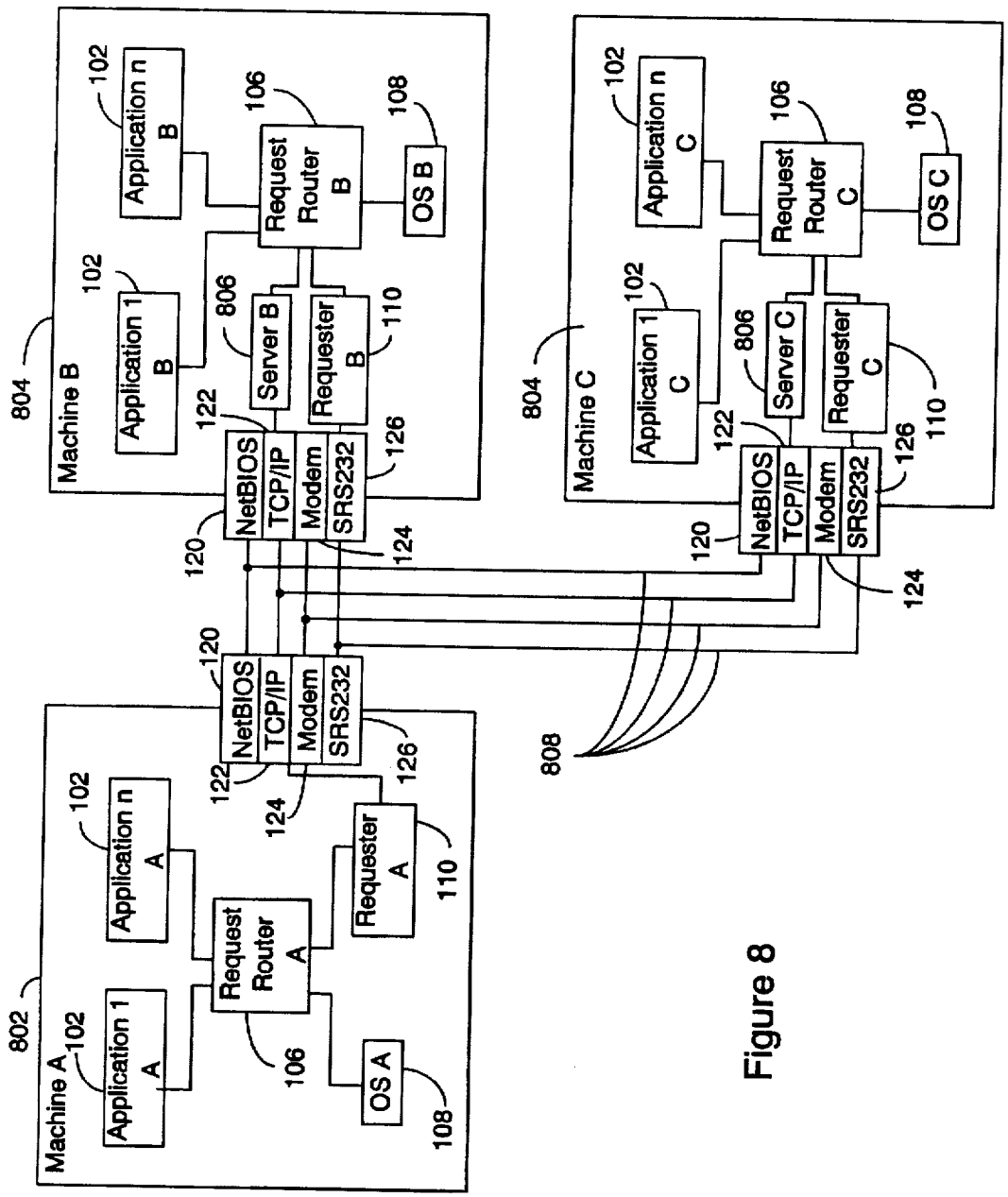
FIG. 8 is a diagram showing a requester (machine A) interconnected with two servers (machines B–C).

FIG. 8 illustrates a configuration in which a system 802 and multiple servers 804 communicate with one another.

Figure 9:
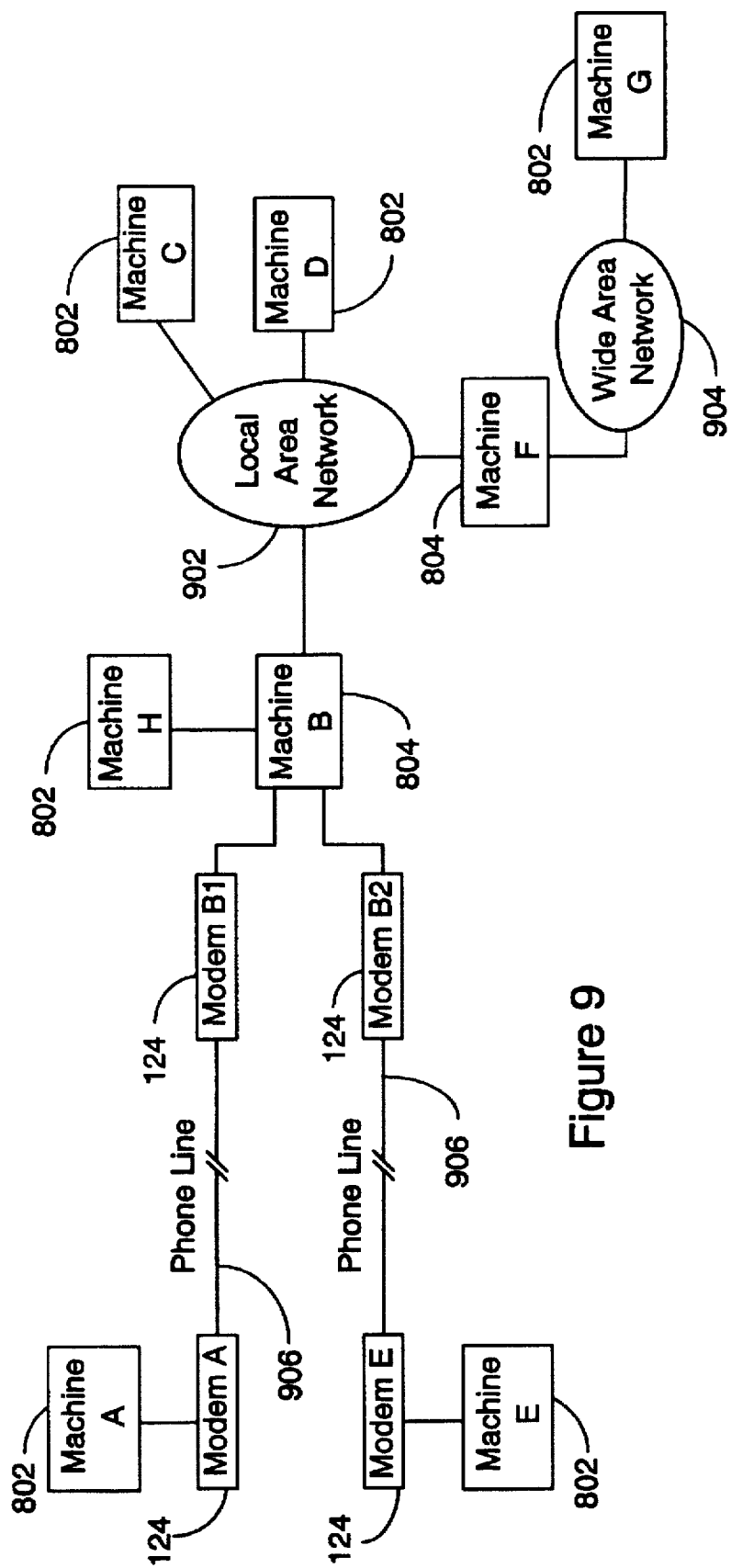
FIG. 9 is a diagram illustrating multiple requesters connected to servers via local area networks (LANs) and wide area networks and public telephone networks.

FIG. 9 illustrates a configuration in which multiple systems 802 and multiple servers 804 communicate with one another via modems 124 over phone lines 906 and also over LANs 902 and wide area networks 904. This figure illustrates the ability of the system to interface with multiple communications protocols.

Figure 10:
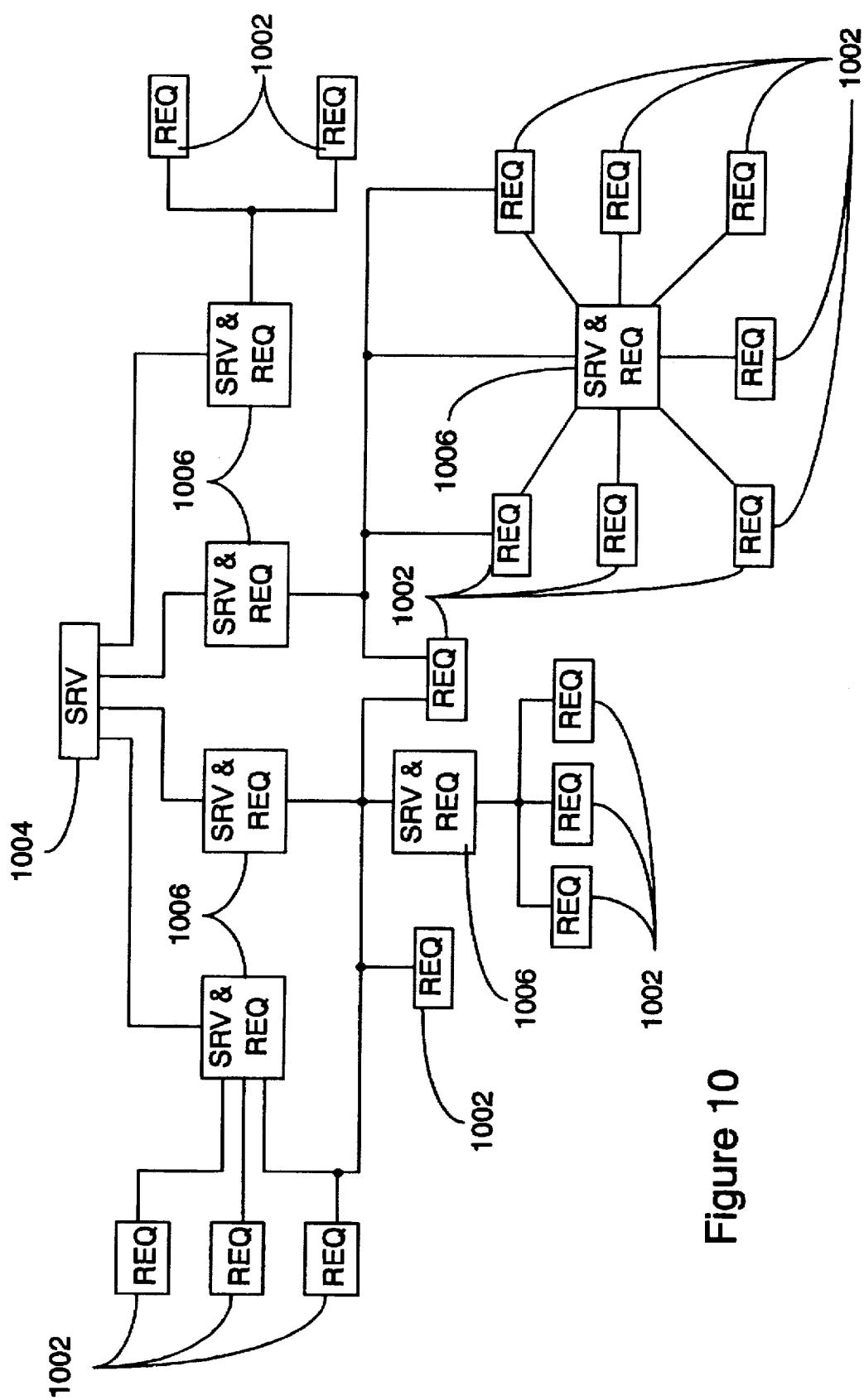
FIG. 10 is a diagram illustrating multiple requesters connected to servers and server/requester systems.

FIG. 10 illustrates a configuration in which multiple requester systems 1002, multiple server systems 1004, and multiple server/requester systems 1006 communicate with one another. The configuration in this figure is similar to that shown in FIG. 9.

Figure 11:
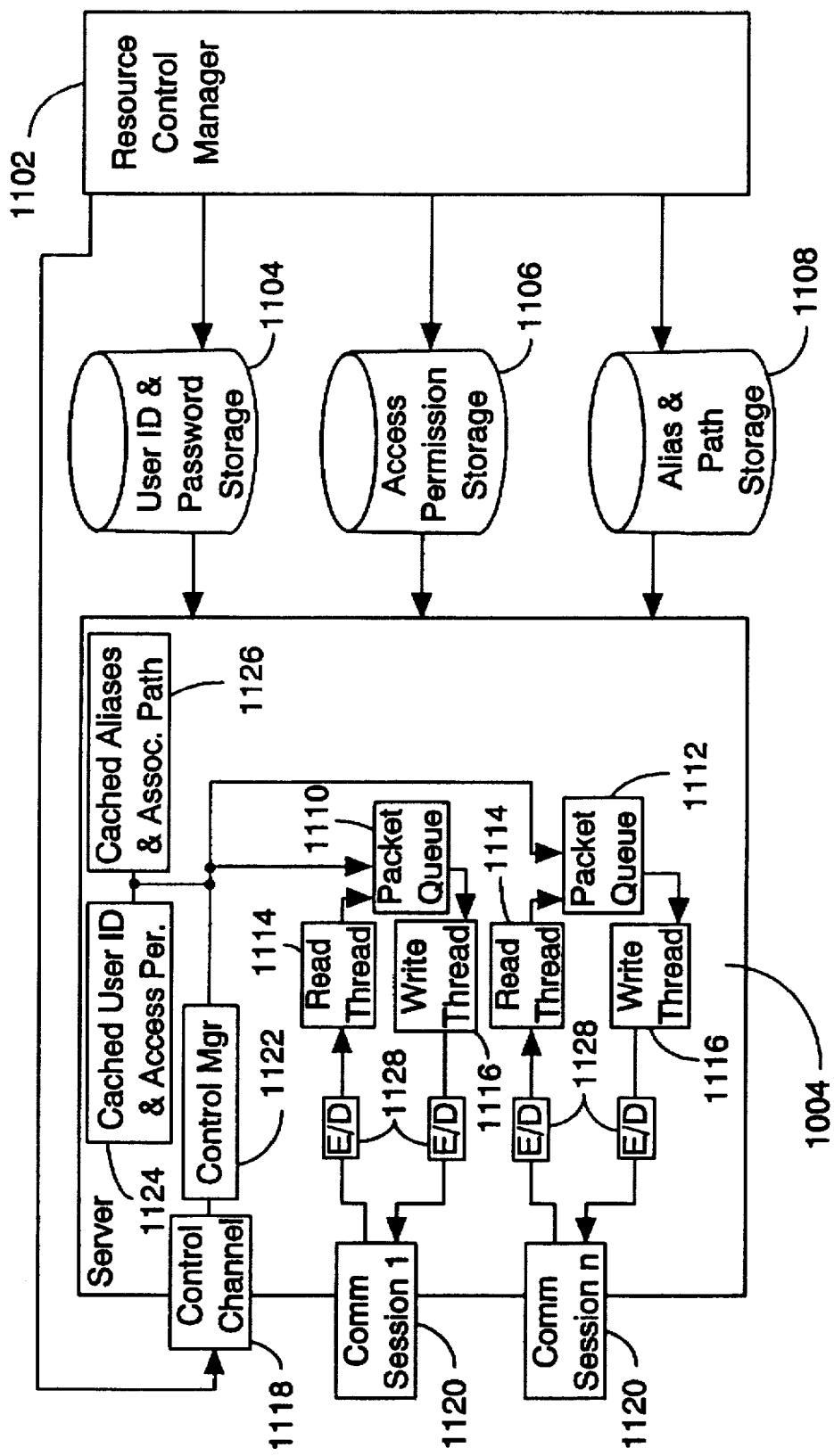
FIG. 11 is a diagram illustrating the server used in the preferred embodiment.
Figure 12:
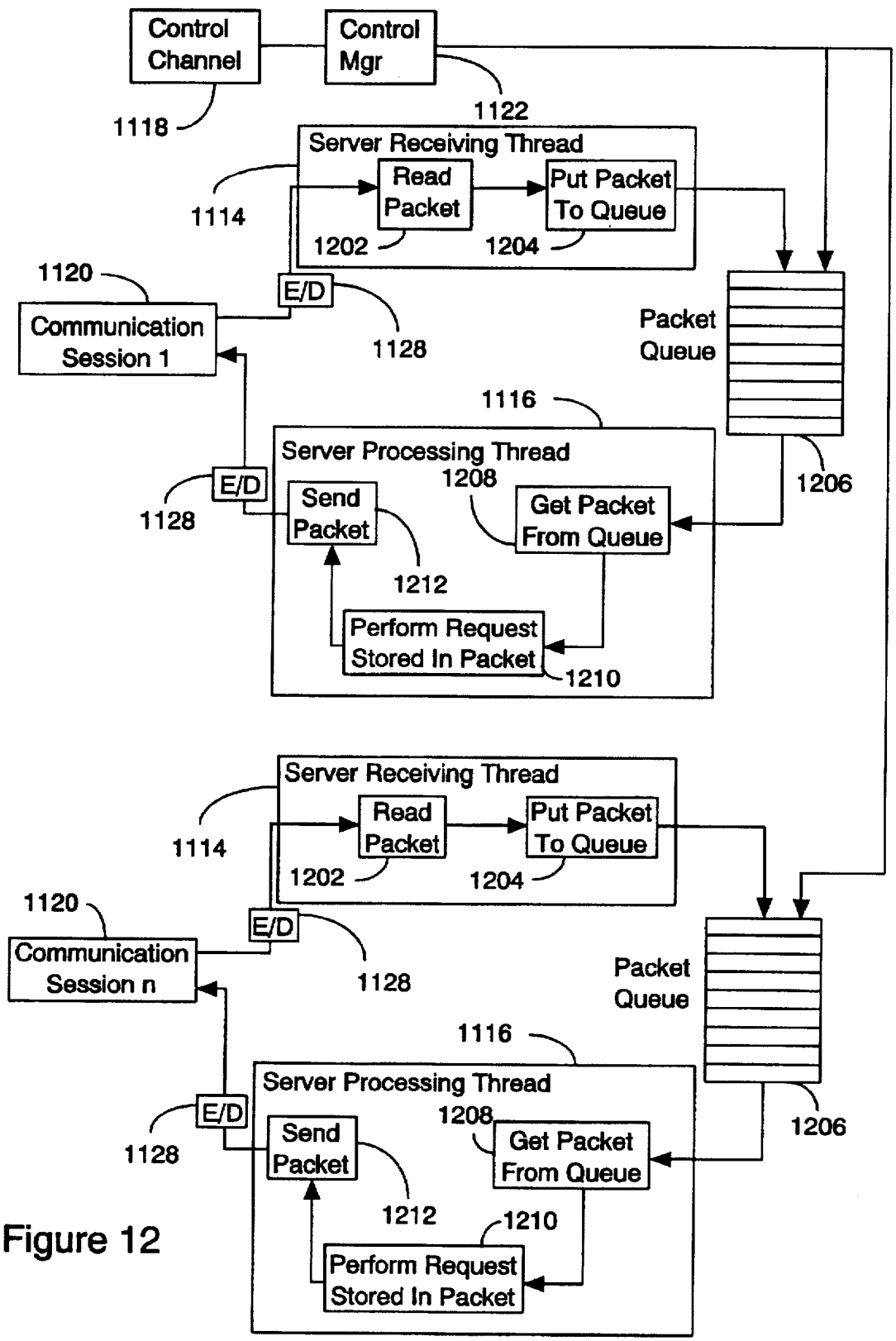
FIG. 12 is a diagram illustrating the read/write threads and packet queues used by the server of FIG. 11.

FIGS. 11 and 12 illustrate a configuration in a server 1004 which includes communication sessions 1120 to communicate with requesters, encrypter/decrypter 1128, read threads 1114, write threads 1116, packet queues 1110, 1112, a resource control manager 1102 to control user ID, access permission and alias and path storage 1104, 1106, 1108. The cached user ID and access permission 1124 and the cached alias and associated path 1126 caches are used to store data from the access permission storage 1106 and the alias and path storage disks 1108 for improved system performance.

To protect resources on the network domains, an access control list (ACL) is used for each network domain in access permission storage 1106. The ACLs are managed by network administrators to define to which resources a user can access and what kind of accesses the user has to each resource. The system provides a sophisticated ACL so that a user cannot view or access any resources other than those assigned. The following access permissions are used by our ACLs:

READ_FILE
WRITE_FILE
CREATE_FILE
DELETE_FILE
EXECUTE_FILE
CHANGE_ATTRIBUTE
ACCESS_SUBDIR
CREATE_SUBDIR
REMOVE_SUBDIR

For example, if the user is not permitted access to any subdirectories from a network resource, the user will not see any subdirectory at all when viewing the network resource. If for some reasons the user knows a particular subdirectory exists under the network resource, he cannot access it anyway. The management of network resources and user access permissions is provided with a user-friendly Graphical User Interface application. Together with the logon procedure, ACLs provide effective protections to the resources on the network domains.

FIG. 12 is a more detailed view of the server 1004 of FIG. 11. A control manager 1122 within the server 1004 is responsible for communication between the server 1004 and other applications on the server 1004 machine. Thus, the server 1004 can be informed if a database has been changed by a resource control application. The server 1004 can also accept a message from another application 102 to send to all or selected clients over active sessions. If an electronic mail system should be needed, the server 1004 can save the message and wait until a client is logged on to send the message over the session. To support these features, the control manager 1122 posts message or e-mail packets to the incoming packet queues 1206 of the sessions 1120. When the server processing threads 1114, 1116 of the sessions 1120 retrieves the packets from the queue 1206, it will process the packets based on the packet types defined in the packet headers.

FIG. 13A–D illustrates the packet headers used in the logon procedure. A session key KS and an initialization vector IV are defined for a communication session between a client and a server 1004 when security level 1 or higher is desired (in security level 0, no encryption is used).

FIG. 13E illustrates a normal packet such as those used during data transfer. When an e-mail or message packet is sent, the preferred embodiment uses security level 2 by default to protect the messages. In security level 2, both packet header and data are encrypted using single DES encryption.

The requester also has the capability to signal request routers 106 of all applications 102 when a communication session is terminated abnormally whether the request routers 106 are sending request packets or waiting on response packets. In order to perform this feature, the response signals (i.e., the return addresses stored in the request packets) are saved in response-signal queues by the session write thread 1116. Each communication session has a response-signal queue 1206 to reduce the search time. When the response packets are successfully delivered, their corresponding response signals are removed from the queue by the session read threads 1114 of the corresponding communication channels. If an application 102 terminates before its response packets arrive, the response packets are discarded and the response signals are also removed from the queue after all chaining response packets have arrived.

In addition, the read thread of the client session also recognizes different types of packets to determine whether it should route the received packets to the application's request router or to a message manager within the requester. The message manager of the requester is responsible for message and e-mail packets sent from the connected servers. This feature is important because it allows the server to initiate the sending of packets while a session is active. As an example, a hot-link can be defined so that a server can inform the connected clients if a database should be changed or a server administrator can send a message to all or selected clients telling them if a server should be out of service shortly, etc. In a more advanced application, an electronic-mail server application can be written so that the message packets are saved on the server until a client is logged on. At that time, the server will send the saved messages to the connected client.

In the prior art, the requester is the one that translates and formats requests from the applications; thus, it cannot perform preparation ahead of time. In addition, information accumulating in one place could increase the search time. The prior art requires its intrinsics modules in both the application and the requester which may require more resources to be allocated and more machine instructions to be executed. Furthermore, the prior art does not have the capability to accumulate multiple request packets from a requester so that the server can process the next packet request while the previous response packet is traveling back to the requester on the network or being processed by communication devices in their own memory buffers.

In contrast to the prior art, the preferred embodiment contains the formatting and translating code in just one place, the request router 106. Our requester only encrypts packet headers and packet data if necessary and then calls the transport functions to send the packets to the server. In addition, requester 110 is also responsible for saving logon and mounting information, managing the communication sessions, and delivering response packets received from multiple network domains to multiple request routers while sending request packets to the multiple network domains. Requester 110 does not need to know the format of the response data, and can deliver the response packets immediately upon receiving them. The request routers 106 can then format or translate the response data in the applications timeslices while the requester 110 is waiting for other incoming response packets or reading data from the communication devices 120, 122, 124, 126. Thus, the preferred embodiment achieves better performance than the prior art.

The prior art also requires the intrinsic modules to translate and format the application data from a program stack segment to a parameter block before sending it to its requester where the data is once again formatted or copied into a data communication buffer. In contrast, the request routers 106 in the preferred embodiment format the application data only once and store the formatted data into the write token which will be used by the requester and the communication subsystem to send the request packets to the server. When the response packets arrive, the requester 110 uses the response signals to tell the corresponding request routers that their response packets have arrived. At that time, the request routers 106 transfer response data directly from the read tokens into the application buffers. Thus, the preferred embodiment eliminates the overhead of copying data between memory buffers.

Furthermore, the prior art does not have the dynamic packet header feature to support packet authentication on demand. Neither does its server authenticate the requester to prevent replaying of packets by intruders. The prior art also requires two different programs running on the server to wait for incoming data from different communication protocols. The preferred embodiment only requires the server to be started once for multiple communication protocols.

In general, a session on the server 1004 will support multiple applications on the requester; thus, a server 1004 must somehow remember the resources allocated for the client applications so that these resources can be released whether the client applications terminate abnormally or the communication sessions are destroyed abnormally. Our server supports this feature in each session thread. Since the allocated resources are isolatedly remembered for different requesters, the search time is minimum every time they are added or removed from the memorized list. In addition, security audit can be turned on and off by the network resource manager running on the server over the control channel of the server. The network resource manager can toggle the security audit for users or groups whose IDs are supplied in the auditing request packet, or resources whose names are stored in the auditing request packet. The audit can also be logged based on successful, failed, or both transactions.

In the prior art, the application is the one which determines if a session should be started on the host computer. The application then makes a function call to connect to the host computer and another function call to start a host server process. In the preferred embodiment, the session manager of the requester determines if a connection should be established to couple the client computer to the server computer. Once the connection is established, the server automatically creates a server processing thread to process the client request packets received over the connection. After the connection is established, the session manager also performs the auto-logon itself, not the application. The session can then be shared by all the applications on the client machine.

Thus, the session creation and logon are transparent to the applications. If the logon is successful, the server creates a server receiving thread to receive and accumulate request packets in a packet queue so that they will be processed by the server processing thread. When a session disconnect request packet is received, the server receiving and processing threads terminate themselves. However, if the communication session is destroyed abnormally, the server receiving thread simulates a disconnect request packet and appends it to the packet queue to signal the server processing thread to terminate. The server receiving thread then terminates itself.

Note that in the very first logon manually performed by the user, the operation is slightly different than the auto-logon mentioned in the above paragraph. The requester first receives a logon request from the logon application, it establishes the session itself and then performs the logon. This is so done by the command manager of the requester, not by the session manager.

Since request packets are accumulated in the packet queue in the preferred embodiment, the request packets may not be processed immediately upon arrival. In contrast, the prior art must process the request packets immediately to return the status or data to the requester. This may indicate that other applications on the client computer must wait until the return packet has arrived and processed before they can send their requests to the same host computer.

The prior art requires an application to send a function call to the host computer to establish a communication session. Our system establishes a communication session by the requester when it receives a logon request from the logon program or a request router asking for the communcation handle. In addition, our server has the capability to reformat and retranslate the request packets in its own request router before forwarding them to the requester located on the server when the network resources do not reside on the server. That is, multiple servers can be connected together as shown in FIGS. 7-10 to expand the amount of network resources available to requesters. Note that this feature requires the intermediate servers' administrator(s) to manually logon the designated servers since the logon passwords are not stored on the intermediate servers. Users on requesters can perform this logon remotely if their access permissions in the ACLs of the intermediate servers indicate that they can execute programs on the intermediate servers. However, caution must be taken and security level 3 is advised when using this feature since logon user IDs and passwords must be sent along with the executing request packets.

As shown earlier, the very first logon packet is encrypted with three different keys for different parts of the packet. The header of the logon packet is encrypted with a key generated from the server name. This is design to detect outside intruders early in the verification process. For intruders working inside an organization, the server name may be known. Then it comes the middle part of the logon packet which contains the 64-bit random number and the CRC values. These are the heart of the verification since it is encrypted with the key generated from the user ID and the secret password. This scheme allows the server to detect the intruding logon right on the very first packet. The challenge-response process that following the logon packet is to defeat re-played packets.

The encryption system used in the preferred embodiment has several other advantages, as follows. The long term key is derived from a user ID and a secret password. It has 192 bits and is used in a triple-DES encryption enhanced with CBC. The short term key is generated with the X9.17 key generation formula and changed every time a session is established between two nodes on the network. Thus, the encryption occurs at the application layer which exposes the source and destination addresses of the packets when used with TCP/IP and NetBIOS protocols but the intruders must deal with different keys whose lengths are either 64 or 192 bits for different pair of nodes on the network. In addition, the short term key is encrypted and only sent once when the communication session between two nodes is established, not in every packet; thus, it reduces the traffic between two nodes.

Furthermore, the prior art only protects data between site-firewalls, not between nodes. In many cases, data must be protected between nodes within an organization. For instance, high-rank management officers within a private network may want to exchange restricted confidential information without leaks to their employees.

Encryption at the application layer also reduces the cost of replacing the existing network layer and can be done on demand when protection to data is needed. Different security firewalls can easily be established between any pair of nodes with a single click of the fingertip.

Finally, the communication subsystem of the preferred embodiment is a foundation for multiple applications when their use are in demand. With just one communication session between a client and a server, packet sending can be initiated by either party to conduct file transfers, broadcast messages, or e-mail messages. In addition to minimum resources and maximum performance, security is also provided to protect the secret of the data.

While the invention has been described with respect to a preferred embodiment thereof, it will be understood by those skilled in the art that various changes in detail may be made therein without departing from the spirit, scope, and teaching of the invention. For example, the size of encryption keys can be changed, algorithms used to generate the encryption keys can be changed, the device can be implemented in hardware or software, etc. Accordingly, the invention herein disclosed is to be limited only as specified in the following claims.

I claim:

1. A bi-directional security system for a network, comprising:
   at least one client, the client further comprising:
      client communication means to communicate with at least one server;
      packet reception means to receive transmitted packet data from the server;

means to generate and transmit a first packet to the server, at least a portion of the first packet having a first packet header containing client identifying information;

means to encrypt at least a portion of the client identifying information in the first packet header prior to transmission;

means to decrypt at least a portion of the client authenticating information in a second packet header and to determine if the second packet is from the server, the client further having means to terminate the communication if the second packet is from an invalid server;

means to generate and transmit a third packet to the server, at least a portion the third packet having a third packet header containing session information; and means to encrypt at least a portion of the session information in the third packet header prior to transmission; and the server further comprising:

server communication means to communicate with the client;

packet reception means to receive transmitted packet data from the client;

means to decrypt at least a portion of the client identifying information in the first packet header and to determine if the first packet is from a valid client, the server further having means to terminate the communication if the first packet is from an invalid client;

means to generate and transmit a second packet to the client in response to the first packet, at least a portion the second packet having the second packet header containing client authenticating information;

means to encrypt at least a portion of the client authenticating information in the second packet header prior to transmission; and means to decrypt at least a portion of the session information in the third packet header;

whereby, the client and the server each verify the validity of the other by transmitting encrypted identifying information to one another.

2. A security system, as in claim 1, further comprising:

means in the server to generate and transmit a fourth packet to the client in response to the third packet, the fourth packet having a packet header containing session information; and means to encrypt at least a portion of the session information in the fourth packet header prior to transmission.

3. A security system, as in claim 2, wherein:

the client has a userid;

the client has a password;

the first packet is encrypted by:

concatenating a random number to a predetermined bit constant to form a value R;

a CRC signature C1 is generated from the value R and the userid;

the value R is used as a DES key to encrypt the userid;

the server name is used to generate a key K to encrypt the value R;

the key Ka is generated by a one way hash function from the userid and password; and a random number Ra and its CRC signature C2 is generated, Ra and C2 are encrypted using key Ka.

4. A security system, as in claim 3, wherein:

the server further comprises an encrypted client password file;

the second packet is encrypted by:

a key K2 is generated from the server name and a one way hash function to decrypt the packet header of the first packet;

the userid is decrypted using the decrypted value R from the packet header;

the decrypted userid is used to access an authorization table to determine if the first packet is valid;

the userid is used to extract a one way hashed password Kb from the encrypted client password file, the password Kb is then used to decrypt values Ra, C1 and C2;

the value Ra is manipulated via a predetermined formula to produce a random number R'a;

a random number Rb is generated by the server; and

R'a and Rb are encrypted with password Kb, inserted into the packet header of the second packet and transmitted to the client.

5. A bidirectional security system for a network, comprising:

at least one client, the client further comprising:

means to encrypt a first logon packet;

means to transmit the first logon packet to the server;

means to decrypt the second logon packet;

means to encrypt a third logon packet with session information;

a server, further comprising:

means to decrypt the first logon packet;

means to encrypt a second logon packet with client authenticating information;

means to transmit the second logon packet to the client;

means to decrypt the third logon packet; and a communication channel capable transmitting packets between the client machine and the server;

whereby the client and server can establish secure communications by bi-directionally transmitting encrypted data.

6. A security system, as in claim 5, further comprising:

means to encrypt packet data in least two security levels, the first security level having a first packet encryption scheme and the second security level having a second packet encryption scheme;

whereby the security system can selectably encrypt packet data with at least two packet encryption schemes.

7. A security system, as in claim 6, further comprising:

means to encrypt packet data at least three security levels, the third security level having a third packet encryption scheme;

whereby the security system can selectably encrypt packet data with at least three packet encryption schemes.

8. A security system, as in claim 7, wherein the first packet encryption scheme is a single DES encryption.

9. A security system, as in claim 8, wherein the second packet encryption scheme is a triple DES encryption.

10. A security system, as in claim 9, wherein:

the first packet encryption scheme encrypts the packet header information; and the second packet encryption scheme encrypts the packet header information;

the third packet encryption scheme is a triple DES encryption, and further encrypts the packet header and the packet data.

11. A security system, as in claim 10, wherein:

the server further comprises means to encrypt a fourth logon packet with session information; and the client further comprises means to decrypt the fourth logon packet.

12. A security system, as in claim 9, wherein:

the client further comprises means to encrypt data packets; and the server further comprises means to encrypt data packets;

data packets are selectably encrypted using at least one of the security levels; and means to dynamically adjust the size of the packet header based on the selected encryption scheme.

13. A security system, as in claim 5, wherein:

each client includes at least one application program; and the server further comprises at least one packet queue for each client;

whereby application performance is improved by reducing packet search time.

14. A method of securely transmitting packet data between a client and a server with encrypted packets, including the steps of:

using at least one communication channel to transmit packets between at least one client machine and at least one server;

encrypting in the client a first logon packet;

transmitting the first logon packet to the server;

decrypting the first logon packet in the server;

encrypting a second logon packet in the server with client authenticating information;

transmitting the second logon packet to the client;

decrypting the second logon packet in the client;

encrypting in the client a third logon packet with session information;

decrypting the third logon packet in the server;

whereby the client and server can establish secure communications by bi-directionally transmitting encrypted data.

15. A method, as in claim 14, including the further steps of:

encrypting a fourth logon packet in the server with session information;

transmitting the fourth logon packet to the client; and decrypting the fourth logon packet in the client;

using the session information to control encryption of packets while communicating between the client and the server.

16. A method, as in claim 15, including the further step of using at least two selectable encryption schemes, including a first encryption scheme for a first security level and a second encryption scheme for a second security level.

17. A method, as in claim 16, including the further steps of:

using at least two communication channels to communicate between multiple client and server, at least a first communication channel having a first level of security and at least a second communication channel having a second level of security; and selecting the first encryption scheme for the first communication channel and the second encryption scheme for the second communication channel.

18. A method, as in claim 17, including the further step of using single DES encryption for the first level of security and triple DES encryption for the second level of security.

19. A method, as in claim 18, including the further steps of:

using packets which contain a header portion and a data portion; and using a third encryption scheme in which triple DES encryption is used for the packet header and the packet data.

20. A method, as in claim 19, including the further steps of:

selecting the encryption scheme based on the nature of the data in the packet; and dynamically adjusting the size of the packet header based on the selected encryption scheme.

* * * * *